(12) United States Patent
Mader et al.

(10) Patent No.: US 6,715,289 B2
(45) Date of Patent: Apr. 6, 2004

(54) TURBO-ON-DEMAND ENGINE WITH CYLINDER DEACTIVATION

(75) Inventors: Christopher H. Mader, deceased, late of Oakland, MI (US), by Carol Mader, legal representative; Ko-Jen Wu, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/118,446

(22) Filed: Apr. 8, 2002

(65) Prior Publication Data

US 2003/0188535 A1 Oct. 9, 2003

(51) Int. Cl.[7] ............................ F02B 33/44; F02B 77/00
(52) U.S. Cl. ............................ 60/612; 60/599; 123/562; 123/198 F
(58) Field of Search .................... 60/612, 599, 602; 123/562, 198 F

(56) References Cited

U.S. PATENT DOCUMENTS

| | | | | |
|---|---|---|---|---|
| 4,122,679 A | * | 10/1978 | Charron | 60/599 |
| 4,781,027 A | * | 11/1988 | Richter et al. | 60/612 |
| 4,781,160 A | * | 11/1988 | Lohr et al. | 123/198 F |
| 5,190,015 A | * | 3/1993 | Nakata et al. | 60/612 |
| 5,313,798 A | * | 5/1994 | Yoshioka et al. | 60/612 |
| 5,351,486 A | * | 10/1994 | Yoshioka et al. | 60/612 |
| 5,653,198 A | * | 8/1997 | Diggs | 123/198 F |
| 6,158,218 A | * | 12/2000 | Herold et al. | 123/198 F |
| 6,276,138 B1 | * | 8/2001 | Welch | 123/198 F |
| 6,484,500 B1 | * | 11/2002 | Coleman et al. | 60/612 |
| 6,499,451 B1 | * | 12/2002 | Hendriksma et al. | 123/198 F |

FOREIGN PATENT DOCUMENTS

| | | | | |
|---|---|---|---|---|
| GB | 2220987 A | * | 1/1990 | 123/198 F |
| JP | 58110822 A | * | 7/1983 | 60/612 |
| JP | 03225029 A | * | 10/1991 | 60/612 |
| JP | 03229931 A | * | 10/1991 | 60/612 |
| JP | 05005420 A | * | 1/1993 | 60/612 |

* cited by examiner

Primary Examiner—Thomas Denion
Assistant Examiner—Thai-Ba Trieu
(74) Attorney, Agent, or Firm—Christopher DeVries

(57) ABSTRACT

An engine control system in a vehicle including a variable displacement internal combustion engine, an intake manifold coupled to the variable displacement internal combustion engine, a first turbocharger supplying air to the intake manifold, a first waste gate regulating the boost of the turbocharger, and a controller for controlling the displacement of the variable displacement internal combustion engine.

15 Claims, 2 Drawing Sheets

TURBO-ON-DEMAND ENGINE WITH CYLINDER DEACTIVATION

TECHNICAL FIELD

The present invention relates to the control of internal combustion engines. More specifically, the present invention relates to a method and apparatus to control a variable displacement internal combustion engine equipped with at least one turbocharger.

BACKGROUND OF THE INVENTION

Present regulatory conditions in the automotive market have led to an increasing demand to improve fuel economy and reduce emissions in present vehicles. These regulatory conditions must be balanced with the demands of a consumer for high performance and quick response for a vehicle. Variable displacement internal combustion engines (ICEs) provide for improved fuel economy and torque on demand by operating on the principle of cylinder deactivation. During operating conditions that require high output torque, every cylinder of a variable displacement ICE is supplied with fuel and air to provide torque for the ICE. During operating conditions at low speed, low load, and/or other inefficient conditions for a fully displaced ICE, cylinders may be deactivated to improve fuel economy for the variable displacement ICE and vehicle. For example, in the operation of a vehicle equipped with a six cylinder variable displacement ICE, fuel economy will be improved if the ICE is operated with only three cylinders during relatively low torque operating conditions by reducing throttling losses. Throttling losses, also known as pumping losses, are the extra work that an ICE must perform to pump air from the relatively low pressure of an intake manifold, across a throttle body or plate, through the ICE and out to the atmosphere. The cylinders that are deactivated will not allow air flow through their intake and exhaust valves, reducing pumping losses by forcing the ICE to operate at a higher intake manifold pressure. Since the deactivated cylinders do not allow air to flow, additional losses are avoided by operating the deactivated cylinders as "air springs" due to the compression and decompression of the air in each deactivated cylinder.

Turbocharging may also improve fuel economy by utilizing wasted energy in engine exhaust gas to increase the performance of an ICE. A turbocharger generally includes a turbine and a compressor. Exhaust gases from an ICE are directed to the turbine housing, causing the turbine to rotate. The turbine concomitantly rotates the compressor to force more air into the engine air intake, increasing the power output of the ICE. The additional pressure generated by the compressor is known as boost pressure, which is typically controlled by a wastegate. The wastegate regulates the flow of exhaust gas over the turbine, controlling the speed of the turbine and the compressor. When high engine power is not needed, the wastegate can bypass the turbine dropping the boost pressure, allowing the engine to run closer to atmospheric intake manifold pressure to minimize the need for throttling and improving fuel economy.

SUMMARY OF THE INVENTION

The present invention is a method and apparatus for the control of cylinder deactivation and turbocharging in a variable displacement ICE to improve fuel economy and maintain performance. In the preferred embodiment of the present invention, a six-cylinder internal combustion engine (ICE) may be operated as a three-cylinder engine by deactivating three cylinders. The cylinder deactivation occurs as a function of load or torque demand by the vehicle as determined by variables such as manifold pressure. If the ICE is in a condition where it can deliver the desired torque with partial displacement to improve efficiency, the controller will deactivate the mechanisms operating the valves for the selected cylinders and also shut off fuel and spark to the selected cylinders. The deactivated cylinders will then function as air springs.

Fuel economy for a variable displacement ICE is maximized by operating in a partially-displaced mode or configuration. The present invention maximizes the amount of time spent in a partially-displaced operation while maintaining the same performance and driveability of a fully-displaced ICE. Fuel economy improvement is maximized by entering a partially-displaced configuration as quickly as possible, and staying in the partially-displaced configuration for as long as possible in the operation of a variable displacement ICE.

Turbocharging can further improve the operation of a variable displacement engine operating in a partially-displaced mode by providing a larger torque range within which the engine can operate in the partially-displaced mode and/or by further reducing throttling losses if the engine displacement is reduced from its original size. A turbocharger can assist in engine transient operation by its ability to regulate air flow. For example, when the engine switches from partially-displaced to fully-displaced mode, the turbocharger can provide immediate increase in air flow without throttle movement.

DESCRIPTION OF THE PREFERRED EMBODIMENT

Figure 1:
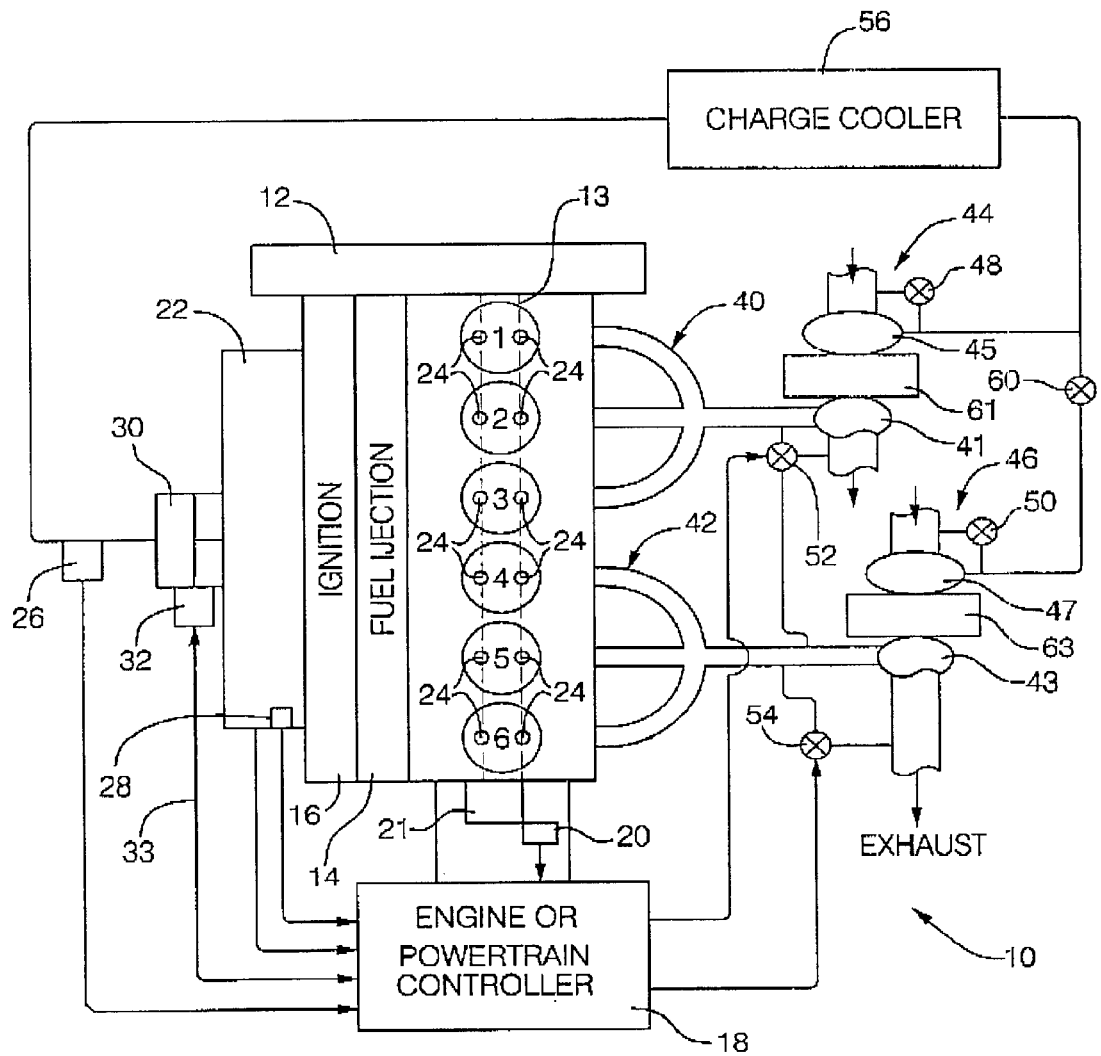
FIG. 1 is a diagrammatic drawing of a variable displacement engine equipped with twin turbochargers.

FIG. 1 is a diagrammatic drawing of the vehicle control system 10 of the present invention. The control system 10 includes a variable displacement ICE 12 having fuel injectors 14 and spark plugs 16 controlled by an engine or powertrain controller 18. The ICE 12 crankshaft 21 speed and position are detected by a speed and position detector 20 that generates a signal such as a pulse train to the engine controller 18. The ICE 12 may comprise a gasoline ICE or any other ICE known in the art. An intake manifold 22 provides air to the cylinders 1-2-3-4-5-6 of the ICE 10, the cylinders include valves 24, as is known in the art. The valves 24 are further coupled to an actuation apparatus 13 such as used in an overhead valve or overhead cam engine configuration that may be physically coupled and decoupled to the valves to shut off air flow through the cylinders 1-2-3-4-5-6. An air flow sensor 26 and manifold air pressure (MAP) sensor 28 detect the air flow and air pressure within the intake manifold 22 and generate signals to the powertrain controller 18. The airflow sensor 26 is normally installed in the air flow passage leading to the intake manifold 22 and is preferably a hot wire anemometer and the MAP sensor 28 is preferably a strain gauge.

An electronic throttle 30 having a throttle plate controlled by an electronic throttle controller 32 controls the amount of air entering the intake manifold 22. The electronic throttle 30 may utilize any known electric motor or actuation technology in the art including, but not limited to, DC motors, AC motors, permanent magnet brushless motors, and reluctance motors. The electronic throttle controller 32 includes power circuitry to modulate the electronic throttle 30 and circuitry to receive position and speed input from the electronic throttle 30. In the preferred embodiment of the present invention, an absolute rotary encoder is coupled to the electronic throttle 30 to provide speed and position information to the electronic throttle controller 32. In alternate embodiments of the present invention, a potentiometer may be used to provide speed and position information for the electronic throttle 30. The electronic throttle controller 32 further includes communication circuitry such as a serial link or automotive communication network interface to communicate with the powertrain controller 18 over an automotive communications network 33. In alternate embodiments of the present invention, the electronic throttle controller 32 may be fully integrated into the powertrain controller 18 to eliminate the need for a physically separate electronic throttle controller.

The engine 12 includes exhaust manifolds 40 and 42 which provide exhaust flow to drive turbochargers 44 and 46. Cylinders 1-2-3 are coupled to exhaust manifold 40, and cylinders 4-5-6 are coupled to exhaust manifold 42. The turbochargers 44 and 46 include compressors 45 and 47 having bypass valves 48 and 50, turbines 41 and 43, and waste gate valves 52 and 54. Compressors 45 and 47 are coupled to the turbines 41 and 43 by bearing couplings 61 and 63. A compressor charge cooler 56 is included to cool the air injected into the intake manifold 22 by the turbochargers 44 and 46.

During normal bi-turbo operation of the ICE 12 in a fully displaced configuration, the firing order of the cylinders will be 1-5-3-6-2-4. During normal boosted operation of the turbochargers 44 and 46, a portion of the engine exhaust flow can bypass the turbines in the turbochargers 44 and 46 to maintain the desired boost level. Generally, this is a fraction of the total flow such that most of the exhaust gas flows through the turbines. The waste gate valves 52 and 54 are regulated by the powertrain controller 18 using rotary actuation and pulse width modulation to control the position of the wastegate valves 52 and 54 and control the boost.

The ICE 12 of the present invention enters a partially-displaced configuration during relatively low power demand/light load driving conditions. The engine 12 will operate on three cylinders 1-2-3 of the six cylinders with cylinders 4-5-6 deactivated. The firing order in a partially-displaced configuration will be 1-3-2. In such a partially-displaced operating configuration, there are reduced friction losses and no pumping losses for the deactivated cylinders 4-5-6. The waste gate 52 is a three-position valve and is positioned and modulated such that exhaust gas may be ported to the exhaust of turbocharger 44 or to the turbine 43 of turbocharger 46. The turbine 43 of turbocharger 46 continues to rotate from the gated gas of turbocharger 44 in a partially-displaced configuration, and since there is no flow to cylinders 4-5-6 the compressor 47 of turbocharger 46 is bypassed using the bypass valve 50 such that there is no compression of the air created by the compressor 47 of turbocharger 46. Furthermore, the turbine 43 of turbocharger 46 is still maintained or rotated such that bi-turbo operation in a fully-displaced configuration can be entered quickly from the partially-displaced configuration. A differential valve 60 closes in the partially-displaced mode to prevent air flow through the exit port of the compressor 45 of turbocharger 44 to the compressor 47 of turbocharger 46. The necessary turbocharging boost supplied by the turbocharger 44 to maintain relatively light loads with only cylinders 1-2-3 activated is determined empirically on a dynamometer. Waste gate 52 regulation for turbocharger 46 is also calibrated for a partially-displaced configuration.

The reactivation of cylinders 4-5-6 is executed after a predetermined rate of change of accelerator pedal position is reached or any other indication of a high torque command or load. Both turbochargers 44 and 46 are active in a fully-displaced configuration for the ICE 12 and the waste gate 52 in a fully-displaced configuration bypasses to the exhaust instead of turbocharger 46 with the second waste gate 54 resuming normal operation.

Figure 2:
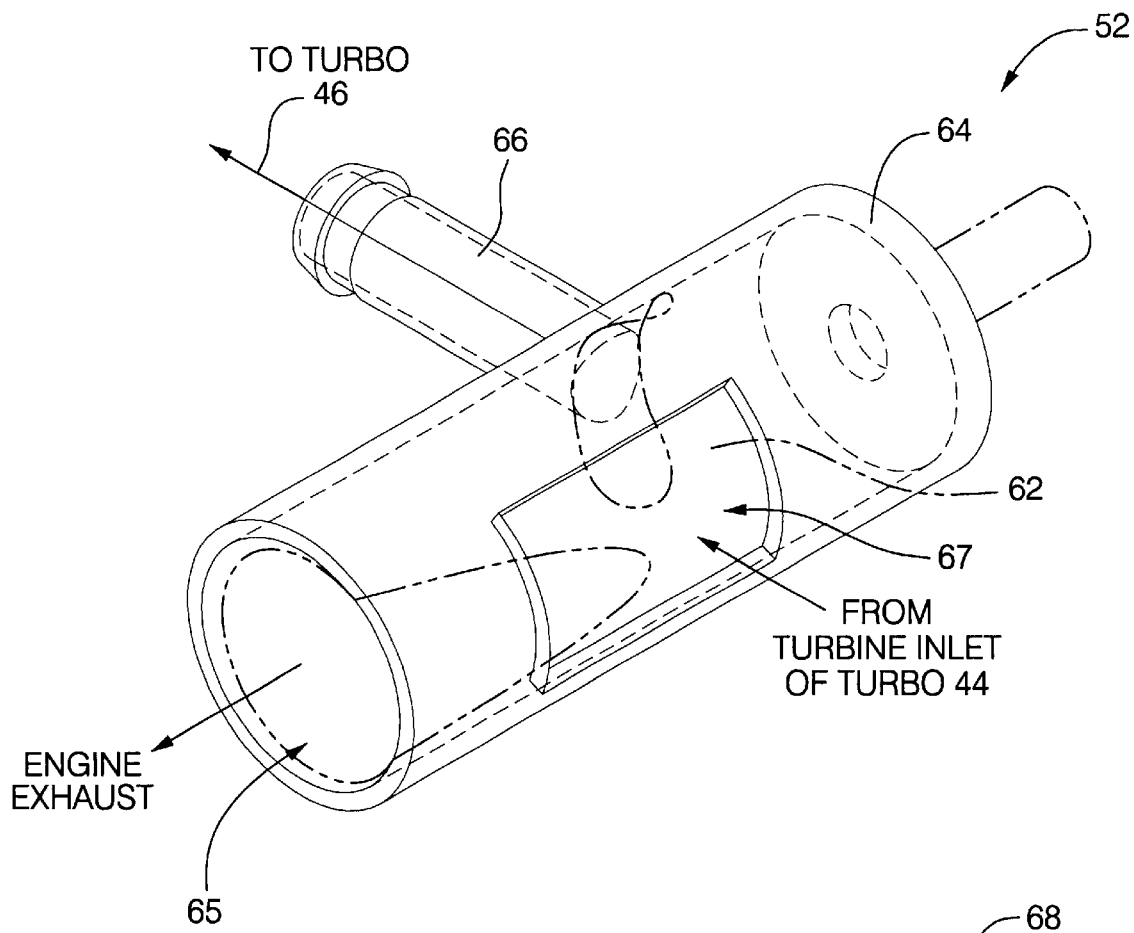
FIG. 2 is a diagrammatic drawings of a turbocharger wastegate of the present invention.
Figure 3:
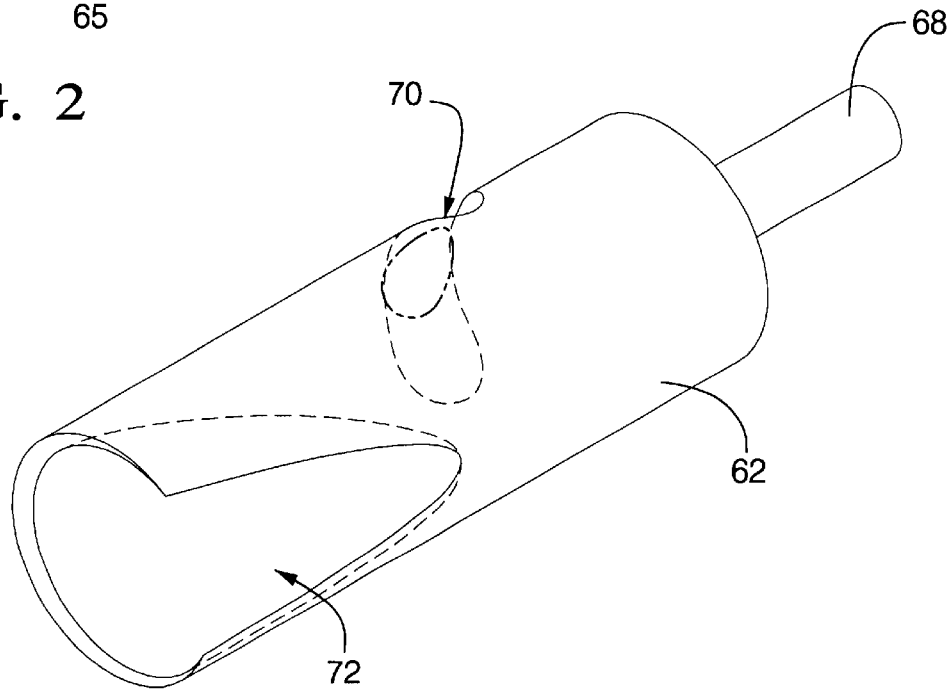
FIG. 3 is a diagrammatic drawing of a spool in the turbocharger wastegate of the present invention.

FIGS. 2 and 3 are a more detailed illustration of the three-way waste gate 52. During deactivation of cylinders 4-5-6, the three-way waste gate 52 bypasses exhaust gas from turbocharger 44 to turbocharger 46 such that the turbine 43 of turbocharger 46 remains spinning. The three-way waste gate valve 52 includes a ported ceramic spool 62, a containment housing 64 which is integral to the turbine housing, a pipe 66 with bellows connected fluidly to turbo 46 and an aperture 65 connected to the outlet of turbine 41. A second aperture 67 fluidly couples the waste gate 52 to the inlet of the turbine 41 of turbo 44. The spool 62 is rotated by a rotary actuator by an extension shaft 68. As the spool 62 is rotated counterclockwise, increasing port area 70 and 72 is exposed until maximum flow to turbocharger 46 is reached. When turbocharger 46 is deactivated along with cylinders 4-5-6, the spool 62 can be rotated such that the bypass flow now feeds the inlet of turbocharger 46 to maintain the rotational speed of the turbine 43 of turbocharger 46. In this way, turbocharger 46 may be reactivated relatively quickly with the activation of cylinders 4-5-6, eliminating turbo lag.

While this invention has been described in terms of some specific embodiments, it will be appreciated that other forms can readily be adapted by one skilled in the art. Accordingly, the scope of this invention is to be considered limited only by the following claims.

What is claimed is:

1. An engine control system in a vehicle comprising:

a variable displacement internal combustion engine;

an intake manifold coupled to said variable displacement internal combustion engine;

a first turbocharger supplying air to said intake manifold; and a controller for controlling the displacement of said variable displacement internal combustion engine; and wherein when said cylinders of said variable displacement internal combustion engine are deactivated, air flow is substantially prevented through said deactivated cylinders.

2. The engine control system of claim 1 wherein said variable displacement internal combustion engine is an overhead valve engine.

3. The engine control system of claim 1 wherein said variable displacement internal combustion engine is an overhead cam engine.

4. The engine control system of claim 1 wherein said variable displacement internal combustion engine is a six cylinder engine.

5. The engine control system of claim 1 wherein said variable displacement internal combustion engine is an eight cylinder engine.

6. An engine control system in a vehicle comprising:
a variable displacement internal combustion engine;
an intake manifold coupled to said variable displacement internal combustion engine;
a first turbocharger supplying air to said intake manifold;
a first waste gate regulating the boost of said turbocharger; and
a controller for controlling the displacement of said variable displacement internal combustion engine, wherein when cylinders of said variable displacement internal combustion engine are deactivated, air flow is substantially prevented through said deactivated cylinders.

7. The engine control system of claim 6 wherein said variable displacement internal combustion engine is a gasoline engine.

8. The engine control system of claim 6 wherein said variable displacement internal combustion engine is a six cylinder engine.

9. The engine control system of claim 6 further including a second turbocharger coupled to said intake manifold and an exhaust manifold for cylinders that are deactivated in said variable displacement engine.

10. The engine control system of claim 9 wherein said first waste gate ports exhaust to spin a turbine of said second turbocharger in a partially displaced configuration.

11. The engine control system of claim 9 wherein said first waste gate valve is a three way valve.

12. A turbocharging control system for a variable displacement engine comprising:
a first group of cylinders in the variable displacement engine;
a first exhaust manifold coupled to said first group of cylinders;
a second group of cylinders in the variable displacement engine;
a second exhaust manifold coupled to said second group of cylinders;
a first turbocharger coupled to said first exhaust manifold;
a second turbocharger coupled to said second exhaust manifold; and
a first wastegate coupled to said first turbocharger, wherein said first waste gate gates exhaust to said second turbocharger when said engine is in a partially displaced configuration.

13. The turbocharging control system of claim 12 wherein said first wastegate is a three way valve.

14. A method of controlling a variable displacement internal combustion engine comprising the steps of:
measuring a variable indicative of torque for a variable displacement internal combustion engine;
varying the displacement of the variable displacement internal combustion engine with reference to the variable;
providing a first turbocharger;
providing a second turbocharger;
providing a first waste gate valve;
directing engine exhaust flow from said first turbocharger to said second turbocharger with said first waste gate valve in a partially displaced configuration for the variable displacement internal combustion engine.

15. An engine control system in a vehicle comprising:
a variable displacement internal combustion engine, wherein cylinders of said variable displacement internal combustion engine are deactivated and reactivated in response to torque demand;
an intake manifold coupled to said variable displacement internal combustion engine;
a first turbocharger supplying air to said intake manifold; and
a controller for controlling the displacement of said variable displacement internal combustion engine; and
wherein when said cylinders of said variable displacement internal combustion engine are deactivated, air flow is substantially prevented through said deactivated cylinders.

* * * * *